Patented Oct. 24, 1944

2,360,866

UNITED STATES PATENT OFFICE 2,360,866

SOFTENERS FOR COPOLYMERS OF BUTADIENE HYDROCARBONS AND ALPHA METHYLENE NITRILES

Benjamin S. Garvey, Akron, Ohio, assignor to The B. F. Goodrich Company, New York, N. Y., a corporation of New York No Drawing. Application September 12, 1941, Serial No. 410,604

10 Claims. (Cl. 260—36)

This invention relates to a new class of softeners for synthetic rubber of the type prepared by the copolymerization of a butadiene hydrocarbon and an alpha methylene nitrile, and to the improved compositions obtainable by the use of such softeners.

The softening of synthetic rubber has in general presented problems not encountered in the softening of natural rubber due to differences in behavior on mill rolls, incompatibility of synthetic rubber with certain softening materials commonly employed in natural rubber and other differences in properties. It has been particularly difficult to find satisfactory softeners for the processing of the oil-resisting synthetic rubbers prepared by the copolymerization of a butadiene hydrocarbon and an alpha methylene nitrile. The problem is further complicated by the fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered that esters of aromatic monocarboxylic acids with alcohols containing less than ten carbon atoms are excellent softeners for the synthetic rubbers prepared by the copolymerization of butadiene-1,3 hydrocarbons and alpha methylene nitriles. These softeners greatly improve the processing of this type synthetic rubber and, in addition, impart certain desirable properties to both vulcanized and unvulcanized compositions containing them.

Included in this class of softeners, herein designated as esters of aromatic monocarboxylic acids with alcohols containing less than ten carbon atoms, are the esters of any aromatic monocarboxylic acid which contains a single carboxyl group directly attached to a carbon atom in an aromatic ring, regardless of whether the ring be otherwise unsubstituted or substituted, with any alcohol containing less than ten carbon atoms regardless of whether the alcohol contains other substituents. Thus, this class of softeners includes the esters of unsubstituted aromatic monocarboxylic acids such as benzoic acid, toluic acids, xylic acids, naphthoic acids and the like as well as of substituted aromatic monocarboxylic acids such as the chlorobenzoic acids, nitrobenzoic acids, alkoxybenzoic acids, benzoyl benzoic acids, chloronaphthoic acids and the like with monohydric, dihydric and trihydric alcohols containing less than ten carbon atoms such as methyl, ethyl, propyl, isopropyl, butyl, amyl hexyl and octyl alcohols and the like, benzyl alcohol, cyclohexyl alcohol, tetrahydrofurfuryl alcohol, alkoxy alkyl alcohols, alkoxyaralkyl alcohols, ethylene glycol, diethylene glycol, butanediol, glycerol and the like.

Specific examples of softeners which are advantageously employed in this invention include methyl benzoate, ethyl benzoate, isobutyl benzoate, benzyl benzoate, n-propyl o-toluate, butyl alpha-naphthoate, ethylene glycol monobenzoate, ethylene glycol dibenzoate, butanediol-1,3 dibenzoate, tetrahydrofurfuryl benzoate, benzyl orthochlorobenzoate, propyl trichlorbenzoate, tetrahydrofurfuryl dichlorbenzoate, octyl orthochlorobenzoate, triethylene glycol di-orthochlorobenzoate, glyceryl monochlorobenzoate, butyl orthobenzoyl benzoate, benzyl orthobenzoyl benzoate, propyl nitrobenzoate, butyl 3-hydroxybenzoate, B-ethoxyethyl 3 hydroxybenzoate, chlorobutyl benzoate, butoxy ethyl benzoate, Benzyloxy ethyl benzoate, ethoxy benzyl benzoate, dichloroisopropyl chlorobenzoate, beta-(phenoxyethoxy)ethyl 4-methoxy benzoate, the monomethyl ether of triethylene glycol monoester of 2-methoxy benzoic acid, butoxyethyl o-benzoyl benzoate, etc. The esters of benzoic acid, chlorobenzoic acids, orthobenzoyl benzoic acid and alkoxy benzoic acids with alcohols containing less than ten carbon atoms give best results and are preferred in the practice of this invention.

As mentioned hereinabove the softeners of this invention may be employed with any of the synthetic rubbers prepared by the copolymerization of a butadiene-1,3 hydrocarbon and an alpha methylene nitrile. Although synthetic rubbers prepared by copolymerizing butadiene-1,3 and acrylonitrile in the ratios: 75 parts butadiene–25 parts acrylonitrile, 67 parts butadiene–33 parts acrylonitrile and 55 parts butadiene–45 parts acrylonitrile are commercially available and will ordinarily be employed, synthetic rubbers prepared from these monomers in other proportions as well as synthetic rubbers prepared from any of the butadiene hydrocarbons including, in addition to butadiene-1,3, its homologs such as isoprene, 2-3 dimethyl butadiene-1,3 piperylene and the like and any of the alpha methylene nitriles including, in addition to acrylonitrile, other nitriles of the formula

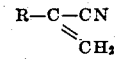

wherein R is an Alkyl group such as methyl, ethyl propyl or butyl, may also be softened effectively by the esters described hereinabove. The copolymerization of the butadiene hydrocarbon and the alpha methylene nitrile to form the synthetic rubber may be effected by any of the methods well known to the art such as homogenous polymerization, polymerization in aqueous emulsion, etc., and other polymerizable compounds may also be copolymerized together with the butadiene hydrocarbon and the alpha methylene nitrile.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 5 to 50 parts by weight of the softener for each 100 parts of synthetic rubber but amounts smaller or larger than this, ranging from 1 to 100 parts of softener for 100 parts of rubber, are also effective. With synthetic rubber prepared by the copolymerization of butadiene hydrocarbons and alpha methylene nitriles in proportions in which the nitrile is present in as much as 40 parts by weight, smaller amounts of softener may be employed than with rubbers prepared using smaller proportions of the nitrile.

The following specific examples will illustrate the practice of this invention and will show the improvement in properties obtainable by using the softeners herein described.

*Example I*

50 parts by weight of benzyl benzoate are added to 100 parts by weight of a synthetic rubber prepared by copolymerizing in aqueous emulsion about 75 parts by weight of butadiene-1,3 and about 25 parts by weight of acrylonitrile. The softener adds rapidly to the synthetic rubber to produce a soft, plastic stock which exhibits greatly improved processing properties and which possess considerable tackiness. When this composition is compounded with the ordinary pigments and vulcanizing ingredients and then cured, a vulcanizate possessing good tensile strength and elongation is produced. The vulcanizate is particularly useful because of its ability to retain its softness and flexibility at low temperatures.

*Example II*

A synthetic rubber prepared by copolymerizing in aqueous emulsion 55 parts by weight of butadiene and 45 parts by weight of acrylonitrile is sheeted out on a tightly set mixing mill and 50 parts by weight of butyl-o-benzoyl benzoate and then added for 100 parts by weight of the rubber. The softener adds to the rubber to produce a soft plastic tacky composition which is then mixed with compounding and vulcanizing ingredients including carbon black, sulfur and a vulcanization accelerator, and vulcanized. The vulcanizate possesses good physical properties and excellent oil resistance. Both the vulcanized and unvulcanized compositions retain their flexibility at temperatures about 20-35° C. lower than the temperatures at which compositions containing this synthetic rubber ordinarily stiffen.

*Example III*

50 parts by weight of tetrahydrofurfuryl 3-5-dichloro-benzoate are incorporated in 100 parts by weight of the synthetic rubber employed in Example II. Only 15 minutes are required for the addition and a plastic easily processed composition having increased tackiness is obtained. When this composition is compounded and vulcanized, a vulcanizate having good physical properties is obtained. This vulcanizate is also especially valuable for its low temperature flexibility.

*Example IV*

25 parts by weight of the mono-ester of glycerol with 3-chlorobenzoic acid are added to 100 parts by weight of a butadiene acrylonitrile copolymer as in Example II. Only 7 minutes are required for the softener to add to the rubber and a plastic composition which processes easily and which possesses increased tackiness is obtained. When this composition is vulcanized an excellent vulcanizate is obtained, which possesses an especially high durometer hardness and which is flexible at low temperatures.

*Example V*

15 parts by weight of butoxyethyl chlorobenzoate are added to 100 parts by weight of a synthetic rubber prepared by copolymerizing 55 parts by weight of butadiene and 45 parts by weight of acrylonitrile. Results similar to those described in the examples above are obtained.

It is to be understood that the above examples have been cited by way of illustration only and are not intended to limit this invention in any respect. Other softeners in this class may be incorporated in synthetic rubber prepared from butadiene hydrocarbons and alpha methylene nitriles to produce excellent unvulcanized and vulcanized compositions. Other materials such as natural rubber, other softeners, pigments, fillers, vulcanizing agents, accelerators, antioxidants and the like may be included in the compositions herein described. Still other modifications which will be apparent to those skilled in the art are also within the spirit and scope of the invention as defined by the appended claims.

I claim:

1. A composition of matter comprising a synthetic rubber prepared by the copolymerization of a butadiene-1,3 hydrocarbon and an alpha methylene nitrile of the formula

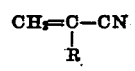

wherein R is a member of the class consisting of hydrogen and alkyl groups containing from one to four carbon atoms and, as a softener therefor, an ester of an aromatic monocarboxylic acid with an alcohol containing less than ten carbon atoms.

2. A composition of matter comprising a synthetic rubber prepared by the copolymerization of a butadiene-1,3 hydrocarbon and an alpha methylene nitrile of the formula

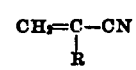

wherein R is a member of the class consisting of hydrogen and alkyl groups containing from one to four carbon atoms and, as a softener therefor, an ester of an aromatic monocarboxylic acid with a monohydric alcohol of the formula R'—OH wherein R' is a hydrocarbon radical containing less than ten carbon atoms.

3. A composition of matter comprising a synthetic rubber prepared by the copolymerization of a butadiene-1,3 hydrocarbon and an alpha methylene nitrile of the formula $$CH_2=C-CN$$
$$\phantom{CH_2=C-}|$$
$$\phantom{CH_2=C-}R$$

wherein R is a member of the class consisting of hydrogen and alkyl groups containing from one to four carbon atoms and, as a softener therefor, an ester of benzoic acid with an alcohol containing less than ten carbon atoms.

4. A composition of matter comprising a synthetic rubber prepared by copolymerizing butadiene-1,3 and acrylonitrile and, as a softener therefor, an ester of benzoic acid with a monohydric alcohol of the formula R'—OH wherein R' is a hydrocarbon radical containing less than ten carbon atoms.

5. A composition of matter comprising a synthetic rubber prepared by the copolymerization of a butadiene-1,3 hydrocarbon and an alpha methylene nitrile of the formula $$CH_2=C-CN$$
$$\phantom{CH_2=C-}|$$
$$\phantom{CH_2=C-}R$$

wherein R is a member of the class consisting of hydrogen and alkyl groups containing from one to four carbon atoms and, as a softener therefor, an ester of a chlorobenzoic acid with an alcohol containing less than ten carbon atoms.

6. A composition of matter comprising a synthetic rubber prepared by the copolymerization of a butadiene-1,3 hydrocarbon and an alpha methylene nitrile of the formula $$CH_2=C-CN$$
$$\phantom{CH_2=C-}|$$
$$\phantom{CH_2=C-}R$$

wherein R is a member of the class consisting of hydrogen and alkyl groups containing from one to four carbon atoms and, as a softener therefor, an ester of a benzoyl benzoic acid with an alcohol containing less than ten carbon atoms.

7. A composition of matter comprising a synthetic rubber prepared by copolymerizing butadiene-1,3 and acrylonitrile and, as a softener therefor, an ester of an aromatic monocarboxylic acid with an alcohol containing less than ten carbon atoms.

8. The composition of claim 7 wherein the softener is benzyl benzoate.

9. The composition of claim 7 wherein the softener is butyl o-benzoyl benzoate.

10. The composition of claim 7 wherein the softener is tetrahydrofurfuryl dichlorobenzoate.

BENJAMIN S. GARVEY.